United States Patent [19]

Zachhuber

[11] Patent Number: 5,572,759
[45] Date of Patent: Nov. 12, 1996

[54] STORAGE AND MAINTENANCE SYSTEM

[76] Inventor: Kurt Zachhuber, Heubergstr. 4, D-83026, Rosenheim, Germany

[21] Appl. No.: 397,197

[22] PCT Filed: Sep. 3, 1993

[86] PCT No.: PCT/EP93/02372

§ 371 Date: Apr. 21, 1995

§ 102(e) Date: Apr. 21, 1995

[87] PCT Pub. No.: WO94/05197

PCT Pub. Date: Mar. 17, 1994

[30] Foreign Application Priority Data

Sep. 9, 1992 [DE] Germany ............... 42 30 197

[51] Int. Cl.⁶ ................................. B60S 5/00
[52] U.S. Cl. ............... 15/1; 15/DIG. 1; 137/234.6
[58] Field of Search ............... 15/1, 323, 53.1, 15/340.1, DIG. 1; 312/223.1; 137/234.6; 320/2; D25/34; D13/107, 108, 109

[56] References Cited

U.S. PATENT DOCUMENTS

| | | | |
|---|---|---|---|
| 2,966,248 | 12/1960 | Armbruster | 320/2 |
| 3,010,129 | 11/1961 | Moore | 15/340.1 |
| 3,308,845 | 3/1967 | Bellas et al. | 137/234.6 |
| 3,621,869 | 11/1971 | Albarran | 137/234.6 |
| 3,698,029 | 10/1972 | Pulliam . | |
| 3,736,948 | 6/1973 | Crosswhite . | |
| 4,036,346 | 7/1977 | Livingston . | |
| 4,188,985 | 2/1980 | Osterman | 137/234.6 |
| 4,667,141 | 5/1987 | Steele | 320/2 |
| 4,711,257 | 12/1987 | Kobayashi | D25/34 |
| 4,880,026 | 11/1989 | Ferre et al. | 137/234.6 |
| 4,983,203 | 1/1991 | Bae et al. | 320/2 |
| 4,989,291 | 2/1991 | Parent . | |
| 5,033,489 | 7/1991 | Ferre et al. | 137/234.6 |
| 5,109,566 | 5/1992 | Kobayashi et al. | 15/340.1 |

FOREIGN PATENT DOCUMENTS

| | | |
|---|---|---|
| 0352459 | 1/1990 | European Pat. Off. . |
| 450586 | 9/1925 | Germany . |
| 737361 | 6/1943 | Germany . |
| 9109059 | 10/1991 | Germany . |
| 58-067548 | 4/1983 | Japan . |
| 59-006144 | 1/1984 | Japan . |
| 62-247952 | 10/1987 | Japan . |

Primary Examiner—David Scherbel
Assistant Examiner—Tony G. Soohoo
Attorney, Agent, or Firm—Helfgott & Karas, P.C.

[57] ABSTRACT

A storage and maintenance system for a mobile cleaning machine or the like comprises a space (6) which is at least partially enclosed for storing the mobile machine (7), guiding elements (9a, 9b) for accurately positioning the machine in the storage space, a first supply unit to replenish the machine energy source and a second supply unit (10, 11) to fill the machine's containers with consumable materials.

10 Claims, 3 Drawing Sheets

STORAGE AND MAINTENANCE SYSTEM

BACKGROUND AND SUMMARY OF THE INVENTION

The present invention relates to a storage and maintenance system for a mobile cleaning machine or the like.

Mobile cleaning machines and the like require regular maintenance and service work to be carried out, sometimes after every use. For example, after use, the machine energy source (batteries, fuel tank or the like) as well as containers for consumable materials (fresh water, cleaning agents, etc.) need to be replenished regularly. Furthermore, wearing parts are to be replaced at irregular intervals, and, if necessary, repairs are to be carried out.

The object of the present invention is to produce optimum conditions to carry out the necessary work. This means that the necessary work and activities can be carried out in a simple manner, quickly, reliably and safely. At the same time the machine should be protected from theft and wilful damage.

According to the present invention this object is achieved by a storage and maintenance system for a mobile cleaning machine, which comprises a space at least partially enclosed for the storage of the mobile machine, guiding elements for accurate positioning of the mobile machine in that space, a first supply unit to replenish the machine energy source and a second supply unit to fill the machine's containers with consumable materials.

In this manner the invention provides a compact "service station", into which the machine is placed after its use and where it is prepared for the next use. The system has a safety advantage since no supply lines or the like will be exposed.

The guide elements provided in accordance with the invention ensure that the machine placed into the storage and maintenance system occupies accurately the intended position. Since the machine is located automatically in the intended position, automatic filling is possible, particularly filling of the machine's containers with consumable materials. Thus after use, the machine need only be placed into the storage and maintenance system by the operator, whereupon the activities necessary to prepare it for the next use (replenishing of the machine energy source as well as filling of the machine's containers with consumable materials) can be carried out automatically. Any operating error, which may lead to damage to the machine, is safely precluded.

In a preferred embodiment of the storage and maintenance system according to the invention a work area as well as tool containers are provided. While the machine is placed in the relevant space of the storage and maintenance system and is connected to the supply units, further necessary maintenance work can be carried out on the associated work areas. The tools necessary for this can be easily retrieved from the associated tool container. With the storage and maintenance system designed in this manner the necessary work can be carried out in a particularly economical manner.

The provision of the storage and maintenance system according to the invention with lockable containers for spare, replacement and wearing parts has provided particularly advantageous. If desired, such containers are provided with locks, which are to be opened by inserting a coin, by means of an individual user card, or by means of a code to be entered. Such an embodiment of the storage and maintenance system according to the invention enables an optimum service particularly with regard to the wearing parts. In this embodiment, the user of the machine has constant access to replacements for wearing parts without carrying his own supply. Also in this embodiment, the containers are regularly checked by the relevant service organisation and refilled, if necessary. Thus it is possible to have a decentralised storage of spare parts maintained by the service organisation. The clients can be invoiced for the wearing parts only when they are removed from the lockable containers. This embodiment of the storage and maintenance system according to the invention contributes to a significantly better availability of the machine and thus to cost savings. Probable wearing parts are, for example, rubber blades, brushes, pads and filters.

The storage and maintenance system according to the invention may also be provided with a disposal unit. If such a disposal unit is intended, for example, for use with a scrubber-suction machine, it will serve the purpose of removal of the used water from the machine and, optionally, treatment of the water. For this purpose the disposal unit comprises a collector funnel and pipelines for the used water and, if applicable, a pump as well as a filter for the treatment of the used water. A press to dehydrate the slurry separated by the filter may also be provided. If desired, the machine's containers, in particular the used water tanks, are cleaned by means of a separate cleaning device, to ensure their complete discharge. Such an additional cleaning device comprises in particular a flushing pump as well as flushing pipelines.

The second supply unit to supply the machine with consumable materials preferably comprises a tank and an apportioning system for the cleaning agent as well as a fresh water supply component. Preferably the apportioning system comprises an automatic metering device. At an easily accessible position, preferably in the vicinity of a central electronic control unit, an operating panel can be provided to set the automatic metering device. Such an automatic metering device ensures particularly that the cleaning agent will always be used in the correct quantities. An unintentional or intentional faulty metering is not possible. As a result of the optimum cleaning results achieved in this embodiment, with a minimal use of the cleaning agents, the work will be carried out both economically and in an environmentally responsible manner. Moreover, such an automatic metering device prevents theft of the cleaning agent. This is because such an automatic device ensures that the cleaning agent is filled exclusively into the respective machine's containers, and not into any other container in which the cleaning agent could be taken away. An automatic metering device can be useful since for every application of the cleaning machine the correct cleaning agent is supplied to the machine.

Automatic controls can also be provided for other consumable materials and also for the machine's energy source replenishment. Such automatic controls exclude incorrect operation by switching on the respective supply units as soon as the machine is placed into the storage and maintenance system.

The storage and maintenance system is provided in a preferred embodiment with means to provide hot water. Appropriately, this has a temperature regulator enabling the desired temperature of the hot water to be adjusted. The water which needs to be supplied must have a certain temperature for certain cleaning agents to achieve an optimum cleaning effect.

A further preferred embodiment of the storage and maintenance system according to the invention is characterised in that it is resting on wheels on the ground. In this way, the storage and maintenance system itself can be stowed in a space-saving manner when not in use. Because it is equipped with wheels, the storage and maintenance system can be assembled by one person wherever it will be utilized, and removed when it is not required.

Furthermore, the storage and maintenance system according to the invention can include holding devices, enabling mountable units to be secured thereto, which units can be removed from the chassis of the machine. In this embodiment it is feasible to move the floor cleaning machine into the storage and maintenance system while the machine has de-mountable units thereon. At the same time, the holding devices of the storage and maintenance system engage the respective complementary parts on the de-mountable units. The chassis of the floor cleaning machine can now be pulled out from below the de-mountable units and, if necessary, can be equipped with other de-mountable unit(s) for using the machine for a different purpose, while the first de-mountable unit is being prepared for a further application (charging of the battery, filling of containers with consumable materials, etc.). In a system of this kind, a single chassis is sufficient, on which the various de-mountable units can be mounted to make cleaning machines available for various applications.

Advantageously, the various connections of the storage and maintenance system to the industrial machine have rapid coupling systems, enabling a complicated operation using various lines, connections and the like to be avoided. Thus, the device according to the invention can be constructed in a particularly compact manner, since no access is needed to make the necessary connections to the machine placed in the space. A further feature to enable the device according to the invention to be yet more compact is provision of a pivotable arrangement of a working area on the device. For example, the working area can be downwardly foldable on an external wall of the storage and maintenance system.

The system according to the invention advantageously includes means for securing the machine placed in it against theft. Depending on the type of the machine, such a theft deterrent may be a security element to connect the machine to the system. Conversely, in another preferred useful embodiment of the system according to the invention, provision is made to enable locking of the storage space for the machine by using, for example, a roller door. In this embodiment, a magnetic card reader may be provided to enable the opening of the roller door. Alternatively, a code is to be entered on the operating panel of a central electronic control unit, thereby establishing entitlement to use the machine. In this embodiment, the machine is protected not only against unauthorised removal from the system according to the invention but also unauthorised manipulation of the machine and, if appropriate, theft of tools, spare pans and the like will be effectively prevented. Furthermore, if the storage space for the machine can be closed by means of a door, the machine will be protected against becoming dirty. This is of particular advantage if the surroundings are dirty, which is the case, for example, on building sites. In addition, such a storage and maintenance system erected in the open air can also protect an industrial machine stored in it from the weather.

BRIEF DESCRIPTION OF THE DRAWINGS

In the following description, the invention is explained in detail based on the drawings, in which.

DESCRIPTION OF THE PREFERRED EMBODIMENTS

Figure 1:
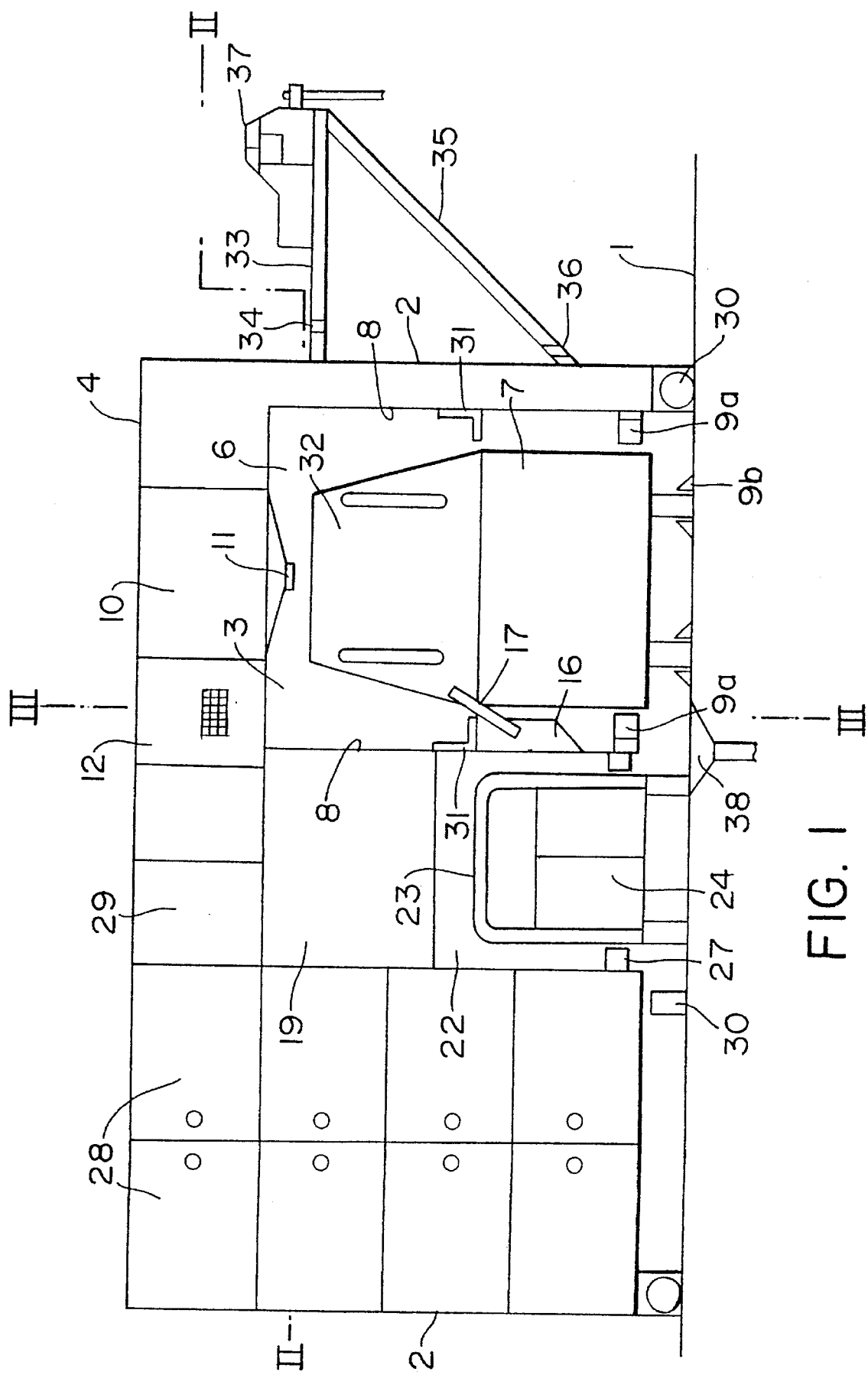
FIG. 1 is a rear view of an embodiment of a storage and maintenance system according to the invention especially adapted to suit a scrubber-suction machine.
Figure 2:
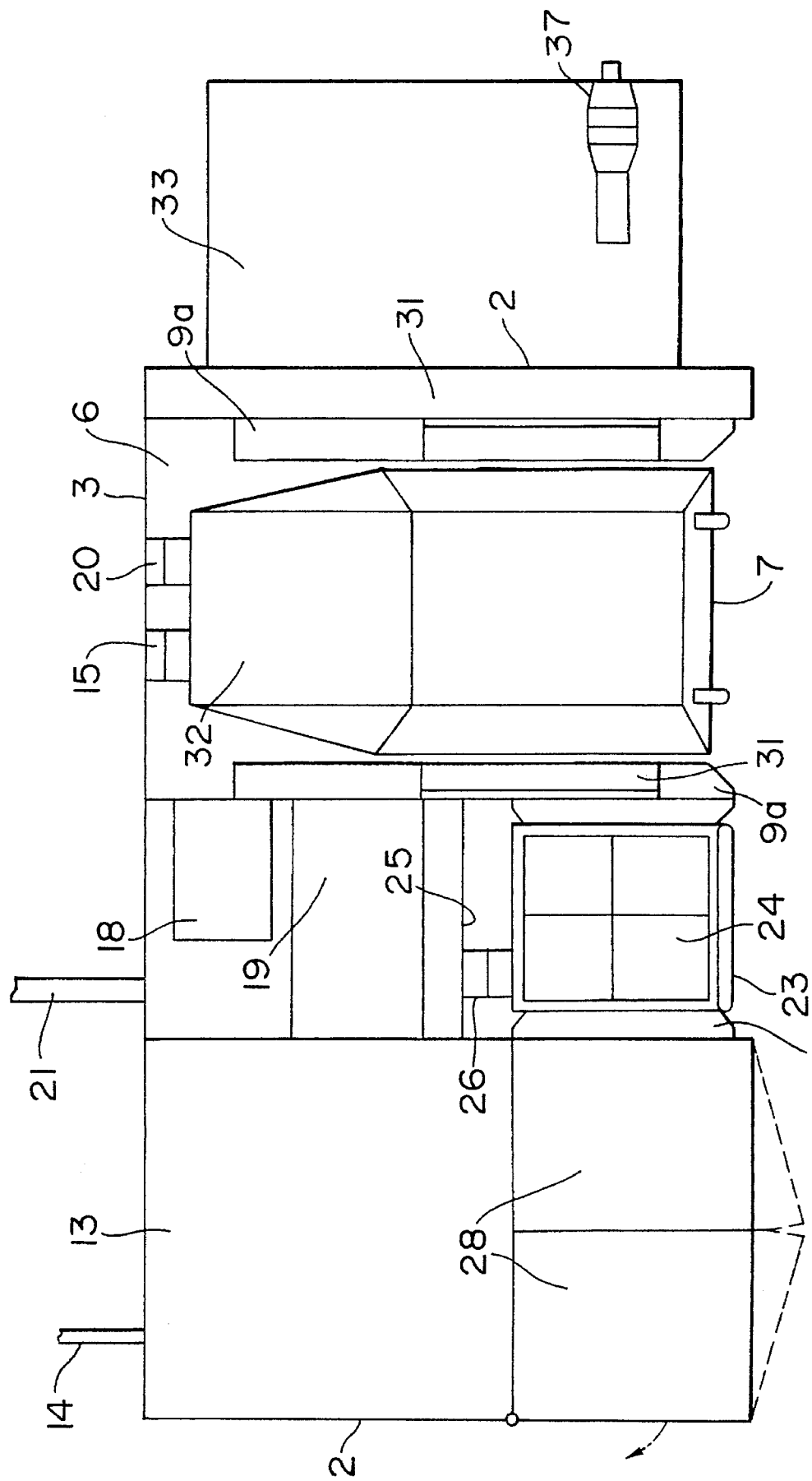
FIG. 2 is a sectional view through line II—II of FIG. 1.
Figure 3:
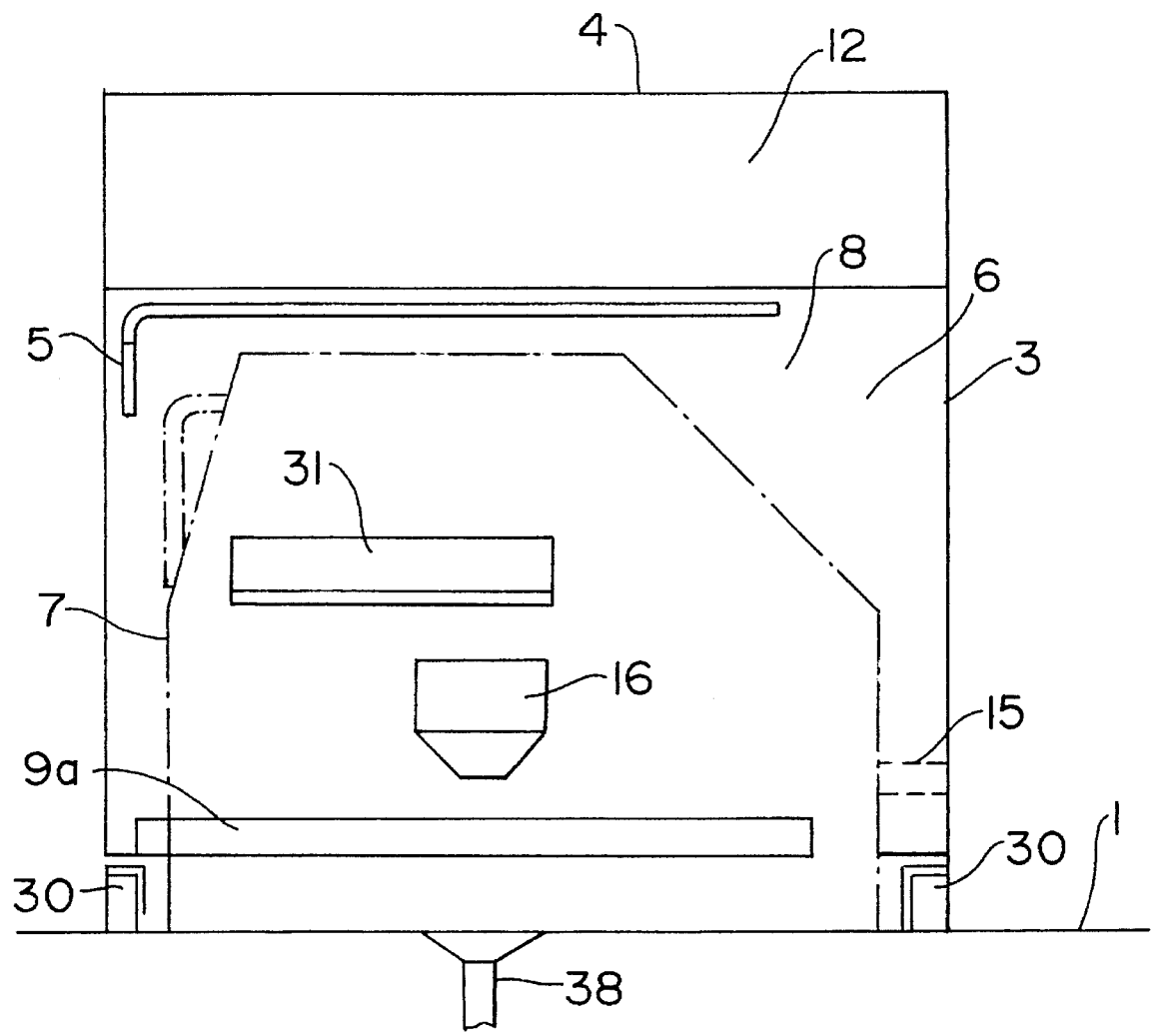
FIG. 3 is a sectional view through line III—III of FIG. 1.

The storage and maintenance system is installed on the ground 1 and has two external side walls 2, a front wall 3, and a roof 4.

A space 6 is provided in the storage and maintenance system, the dimensions of which enable accommodation of the scrubber-suction machine 7. The space 6 is defined by two internal side walls 8 and the front wall 3. The remaining opening can be closed by means of a roller door 5. On both internal side walls 8 a guide bar 9a is provided. These, as well as the guide bars 9b provided on the floor, serve the purpose of positioning the scrubber-suction machine 7 placed in the space 6 so that it will always be in the same position, in which, as it will be explained below, the supply and discharge will be ensured. The guide bars are adjustable, so that they can be adjusted to suit machines of different widths.

Above the space 6 for the scrubber-suction machine 7 and below the cover 4 a tank 10 is suspended together with an apportioning device for cleaning agent. The cleaning agent metered by the apportioning device is filled through the feed nozzle 11 into a cleaning agent container of the scrubber-suction machine 7. The apportioning device is controlled by an electronic control unit 12, which is also provided beneath the cover 4.

For the purpose of charging the batteries of the scrubber-suction machine 7 a battery charger 13 is provided. This is supplied by alternating current via a mains cable 14. The charging current provided by the battery charger is supplied to the scrubber-suction machine 7 via the rapid change coupling 15 which is provided on the front wall 3. The charging process also is controlled by the electronic control unit 12.

For the disposal of the water that has been used for cleaning by the scrubber-suction machine, and which is collected in the machine, a funnel 16 is provided on one of the internal walls 8. The funnel is arranged below the discharge nozzle 17 of the used water tank. The used water collected by the funnel is conveyed to the replaceable used water filter 18 by means of a pump driven by an electric motor. The used water is treated here and can be reused again for cleaning purposes. For this purpose water recirculation 19 is provided. To feed the treated water into the intended container of the scrubber-suction machine 7, a rapid change coupling 20 is provided on the front wall 3. Like the rapid change coupling 125 for the charging current, the coupling 20 makes an automatic connection with the corresponding connection of the machine when the machine 7 is driven into the space 6. Fresh water, which is provided to the storage and maintenance system through the fresh water line 21, can also be supplied to the machine through the rapid change coupling 20.

In addition to the space 6 for the scrubber-suction machine 7, a further space 22 is provided. This space 22 accommodates a battery carriage 23 having exchange batteries 24. The exchange batteries 24 can also be charged by the battery charger 13. For this purpose, a rapid change coupling is provided on the front wall 25 of the space 22, which corresponds to the rapid change coupling 15 of the scrubber-suction machine 7. The position of the battery carriage 23 is also determined by two guide bars 27, so that when the battery carriage is driven into the space 22, an automatic connection for the charging current of the exchange batteries 24 can be produced via the rapid change coupling 26.

In addition to the space 22 for the battery carriage, there are eight compartments 28 for tools as well as spare, replacement and wearing parts. All compartments 28 are closed by means of lockable flaps. The compartments for the spare, replacement and wearing parts can be opened only by authorised persons. For this purpose, a magnetic card reader is connected with the electronic control unit 12, and the access to the compartments 28 for the spare, replacement and wearing parts is released by the electronic control unit 12 when a magnetic card, authorising access, is introduced into the magnetic card reader.

A diagnostic unit 29 functions to check the condition of the electrical equipment as well as of the water. Furthermore, the diagnostic unit checks the operation of the storage and maintenance system and the scrubber-suction machine.

The entire storage and maintenance system is resting on rollers 30 on the ground 1. This makes it possible for a single person to move the system, if this is desired.

Holding claws 31 on the internal side walls 8 of the space 6 are provided. These are part of a lifting device for the mounted tank 32 of the scrubber-suction machine 7. The mounted tanks can be lifted by means of the holding claws, so that the chassis will be available for another use.

A workbench serving as a working area 33 is provided on one of the external side walls 2. This is supported on the side wall 2 and can be folded down on hinges 34 with horizontal pivoting axes. To enable the workbench to fold down, the struts 35 are hinged on the side wall 2 by hinges 35 with vertical pivoting axes. A vice 37 is mounted on the workbench 31.

Below the storage and maintenance system a ground drain 38 is provided. Used water, which is not to be treated, can be discharged from the scrubber-suction machine into the ground drain from the used water discharge 17.

What is claimed is:

1. A storage and maintenance system for a mobile cleaning machine, the system comprising:

an at least partially enclosed space for housing the cleaning machine;

guiding elements for accurate positioning of the cleaning machine in the space;

at least one compartment for holding spare, replacement, and wearing parts, the at least one compartment including locking means adapted to be opened by one of inserting a coin, inserting an individual user card, and entering a code;

a first supply unit for replenishing an energy source of the cleaning machine; and a second supply unit for filling at least one container of the cleaning machine with consumable material wherein at least one of the first and second supply units includes at least one quick coupling unit for automatic connection to the cleaning machine when the machine is positioned into the storage and maintenance system.

2. The storage and maintenance system according to claim 1, wherein the second supply unit comprises at least one tank having an apportioning device for apportioning cleaning agent.

3. The storage and maintenance system according to claim 1, wherein the housing comprises an external wall including a working area foldably mounted thereon.

4. The storage and maintenance system according to claim 1, wherein the housing comprises a roller door for closing the space housing the cleaning machine.

5. The storage and maintenance system according to claim 1, further comprising a cleaning device for cleaning the at least one container of the cleaning machine.

6. The storage and maintenance system according to claim 1, further comprising a hot water preparing device.

7. The storage and maintenance system according to claim 1, further comprising wheels connected to the housing so that the system may rest on the ground.

8. The storage and maintenance system according to claim 1, further comprises adjustable means to adjust the guiding elements to suit various machines.

9. The storage and maintenance system according to claim 1, further comprising a disposal unit including a treatment stage for receiving and treating used water received from the cleaning machine.

10. A storage and maintenance system according to claim 9, wherein the disposal unit further comprises a filter and a slurry press for dehydrating slurry separated by the filter of the disposal unit.

* * * * *